(12) United States Patent
Audy (10) Patent No.: US 11,038,297 B2
(45) Date of Patent: Jun. 15, 2021

(54) COMBINATION OF POWER OUTLET AND PLUG-IN MEMBER FOR PLUGGING ELECTRICAL FIXTURES IN AN ELECTRICAL BOX

(71) Applicant: Marc Audy, Trois-Rivieres (CA)

(72) Inventor: Marc Audy, Trois-Rivieres (CA)

( * ) Notice: Subject to any disclaimer, the term of this patent is extended or adjusted under 35 U.S.C. 154(b) by 67 days.

(21) Appl. No.: 16/442,128

(22) Filed: Jun. 14, 2019

(65) Prior Publication Data
US 2020/0220292 A1    Jul. 9, 2020

(30) Foreign Application Priority Data

Jan. 9, 2019 (GB) ...................................... 1900321

(51) Int. Cl.
| | | |
|---|---|---|
| *H01R 13/42* | (2006.01) | |
| *H02G 3/12* | (2006.01) | |
| *H01R 25/00* | (2006.01) | |
| *F04D 25/08* | (2006.01) | |
| *F04D 29/34* | (2006.01) | |

(52) U.S. Cl.
CPC ........... *H01R 13/42* (2013.01); *F04D 25/088* (2013.01); *F04D 29/34* (2013.01); *H02G 3/123* (2013.01); *H01R 25/006* (2013.01)

(58) Field of Classification Search
CPC ....... H01R 13/42; F04D 25/088; F04D 29/34; H02G 3/123; H02G 3/20; H02G 3/16
See application file for complete search history.

(56) References Cited

U.S. PATENT DOCUMENTS

| | | | |
|---|---|---|---|
| 2,300,487 A | 11/1942 | Conteville | |
| 5,203,712 A * | 4/1993 | Kilpatrick | H01R 31/06 439/211 |
| 6,146,191 A | 11/2000 | Kerr | |
| 6,503,099 B2 | 1/2003 | Kerr | |
| 6,780,049 B1 | 8/2004 | D'Angelo | |
| 7,232,336 B1 * | 6/2007 | Evans | H02G 3/086 439/535 |
| 8,172,589 B2 * | 5/2012 | Johnson | H02G 3/38 439/215 |
| 9,437,978 B2 * | 9/2016 | Green | H01R 24/78 |
| 2016/0091196 A1 * | 3/2016 | Chien | F21V 33/0048 362/253 |

* cited by examiner

*Primary Examiner* — Michael C Zarroli (57) ABSTRACT

A bracket is mechanically fastened on the bottom of an octagonal junction box or a rectangular electrical box such as those used for installing outlets or switches. Onto that bracket is snapped a cube module which itself consists of at least two square modules but generally three or more square modules. Each module connects to the next in a specific sequence and orientation so that a plug-in member can be inserted through the various holes present in the modules. The holes co-operate with prongs extending integrally from the plug-in member wherein each prong has a specific position and length so that the conductive part of the prong connects with a specific place on a specific module. With the prongs connecting at specific locations into the various squares, the proper set of matching wires are electrically connected.

10 Claims, 11 Drawing Sheets

COMBINATION OF POWER OUTLET AND PLUG-IN MEMBER FOR PLUGGING ELECTRICAL FIXTURES IN AN ELECTRICAL BOX

CROSS-REFERENCE TO RELATED APPLICATIONS

The present application claims priority to United Kingdom Patent Application serial number 1900321.9, filed on January, 2019 entitled "Combination of power outlet and plug-in member for plugging electrical fixtures in an electrical box", the disclosure of which is hereby incorporated in its entirety at least by reference.

BACKGROUND OF THE INVENTION

1. Field of the Invention

The present invention relates generally to electrical devices but more particularly to a combination of power outlet and plug-in member for plugging electrical fixtures in an electrical box.

2. Description of Related Art

Installing electrical fixtures, such as lights or fans on a ceiling can be tedious and even dangerous. Even the simple replacement of a light switch in an electrical box can seem complicated for the uninitiated or unskilled. Making the electrical connection requires twisting wires and screwing on insulated connectors, such as MAR connectors. This is a difficult task as it is usually performed when positioned on top of a ladder. Consequently, there needs to be a better way to make electrical connections for ceiling fixtures.

BRIEF SUMMARY OF THE INVENTION

In one embodiment of the present invention an assembly for plugging in electrical fixtures is provided, comprising a power outlet comprised of a plurality of modules having at least one set of plugging holes and at least one set of load holes which provide power to a chandelier or fan located outside of the electrical box; a plug-in member and a prong set configured to plug into one set of the at least one set of plugging holes which provide power to wires going to other locations in the house by acting as a junction box; a bracket fastened to a bottom portion of the power outlet; an electrical box, wherein the bracket is fastened to the electrical box; and, an electrical fixture having a set of wires, wherein the set of wires are electrically connect to the plug-in member.

In one embodiment, a male connector block is provided, wherein the set of wires is connected to the male connector block. In one embodiment, the plurality of modules includes four modules comprised of colors green, red, black, and white corresponding to a ground, power wire for light, power wire for fan, and neutral respectively. In another embodiment, a conductive member positioned inside each module of the plurality of modules is provided. In one embodiment, the conductive member varies depending on which module of the plurality of modules it is intended for. In another embodiment, the conductive member includes a number of contact points configured for making electrical contacts with the set of wires. In one embodiment, each contact point of the number of contact points is located at distal ends of at least one flexible tongue, wherein the at least one flexible tongue is configured to bend and enabling the number of contact points to apply pressure on the set of wires for a secure electrical contact. In yet another embodiment, the conductive member includes two large openings configured for passing nipples in each module. In one embodiment, nipples extend perpendicularly from inside each module, wherein the nipples aid in precisely positioning and securing the conductive member to each module. In one embodiment, each module includes a ridge on a side portion to ensure proper alignment of the plurality of modules.

BRIEF DESCRIPTION OF THE SEVERAL VIEWS OF THE DRAWINGS

Other features and advantages of the present invention will become apparent when the following detailed description is read in conjunction with the accompanying drawings, in which.

DETAILED DESCRIPTION OF THE PREFERRED EMBODIMENT

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein to specifically provide a combination of power outlet and plug-in member for plugging electrical fixtures in an electrical box.

Figure 1A:
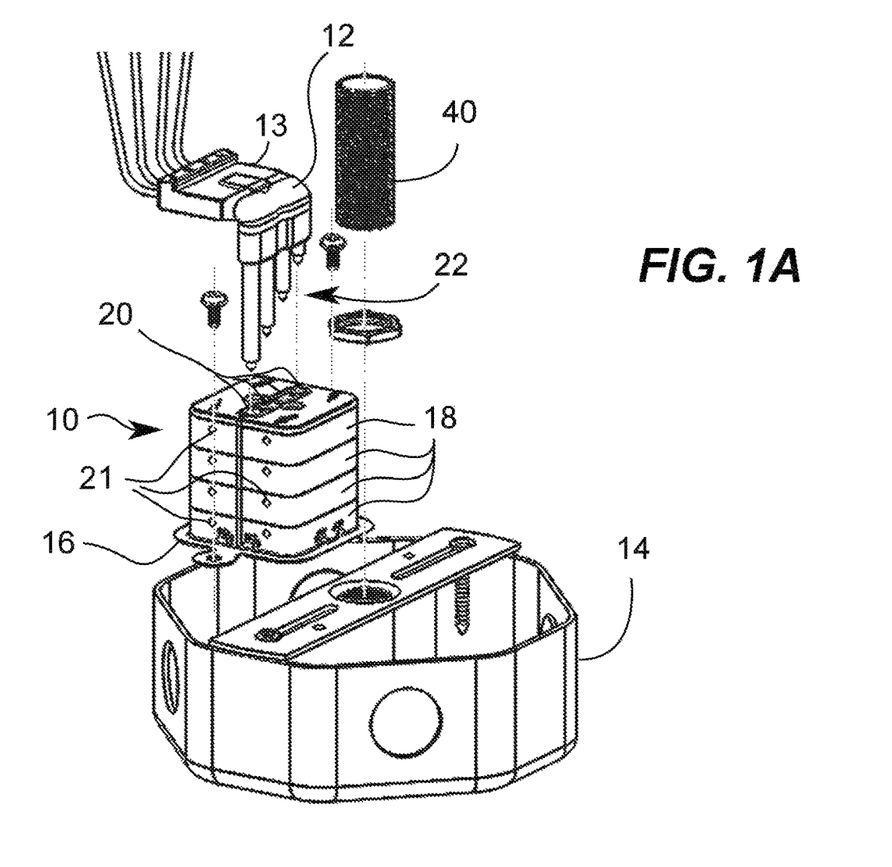
FIG. 1A is an exploded view of the present invention with a junction box without connecting wires according to an embodiment of the present invention.
Figure 1B:
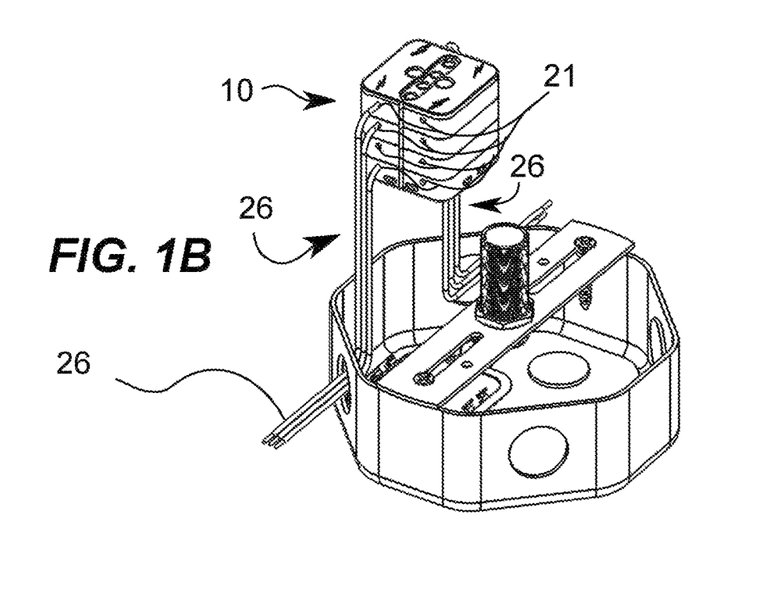
FIG. 1B is an exploded view of the present invention with a junction box with connecting wires according to an embodiment of the present invention.

Referring now to FIGS. 1A-B, a combination of a power outlet 10 and a plug-in member 12 for plugging electrical fixtures in an electrical box 14 is illustrated. The power outlet is configured to be built into the electrical box, and comprises a bracket mechanically fastened to a bottom portion of the electrical box. Preferably, the junction box is octagonal or rectangular, however other configurations and shapes may be provided without departing from the invention. In one embodiment, the power outlet comprises at least two square modules 18. In most embodiments, three or more modules are provided. Each module is configured to connect to an additional module in a specific sequence and orientation such that the plug-in member 12 is operable to be inserted through plugging holes 20 positioned on each module. In one embodiment, the power outlet is cube shaped.

Figures 2A, 2B:
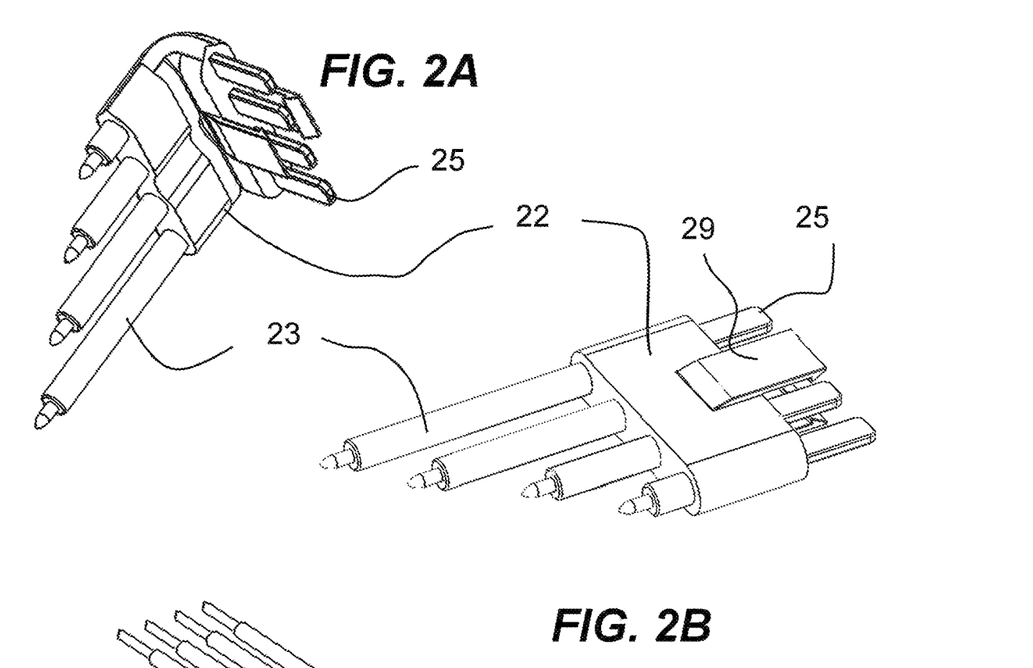
FIGS. 2A-D are various perspective views of plugging connectors according to an embodiment of the present invention.
Figure 2C:
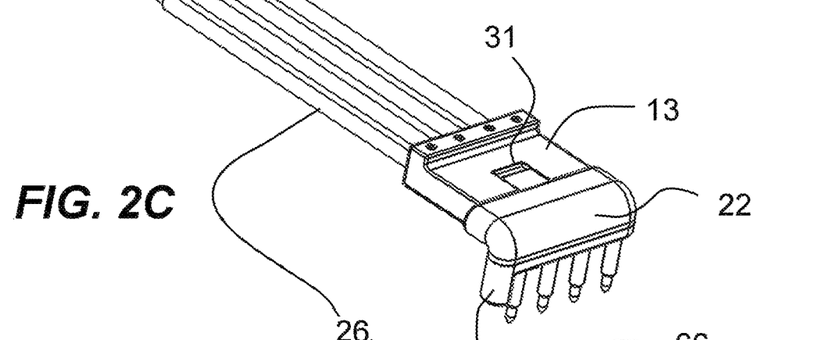
Figure 2D:
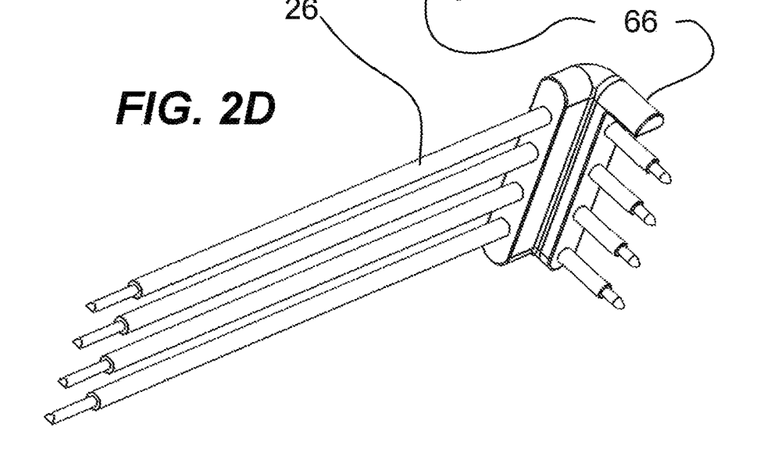

Now referring to FIGS. 1A-B and 2A-D, in one embodiment, the plug-in member includes a prong set 22 extending integrally from the body of the plug-in member. Each prong 23 in the prong set has a specific position and length so that the conductive parts of the prong set connects with a specific location on a specific module 18. The prong set comprises many different variations; a few examples are illustrated in FIGS. 2A-D. The variations include different lengths, angles, etc. In some embodiments, a male connector block 13 is provided. The male connector block, best seen in FIG. 2C, is an optional component for use when computer control or other functionalities are desired. FIG. 2D shows a similar configuration to FIG. 2C but without the male connector block, so that the wires 26 connect directly into the 90 degree prong set 22. Yet in further embodiments, a stub member 66 is provided to aid in the plug-in member connection with the power outlet, this will be discussed in further detail below.

Figure 7:
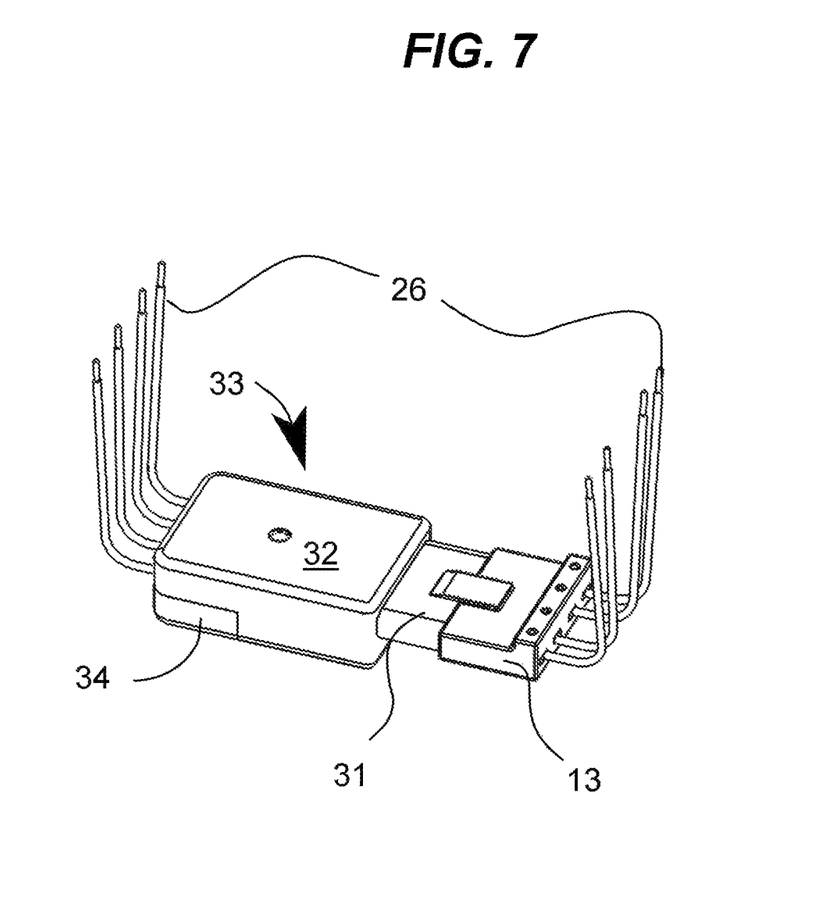
FIG. 7 is a perspective view of the wires connected to the interface directly or by way of the connector and the home automation block according to an embodiment of the present invention.

In some embodiments, as shown in FIGS. 2A-B, the plug-in member includes prong sets 22 having prongs 23 on one end and metal connectors 25 positioned on the opposite end, in either a straight line configuration (FIG. 2B) or 90 degree configuration (FIG. 2A). The prongs 23 are of different lengths so that they can connect to specific modules 18. In one embodiment, the metal connectors are for plugging the plug-in member into a home automation block 31 as seen in FIG. 7 which will be discussed in greater detail below.

Figure 3:
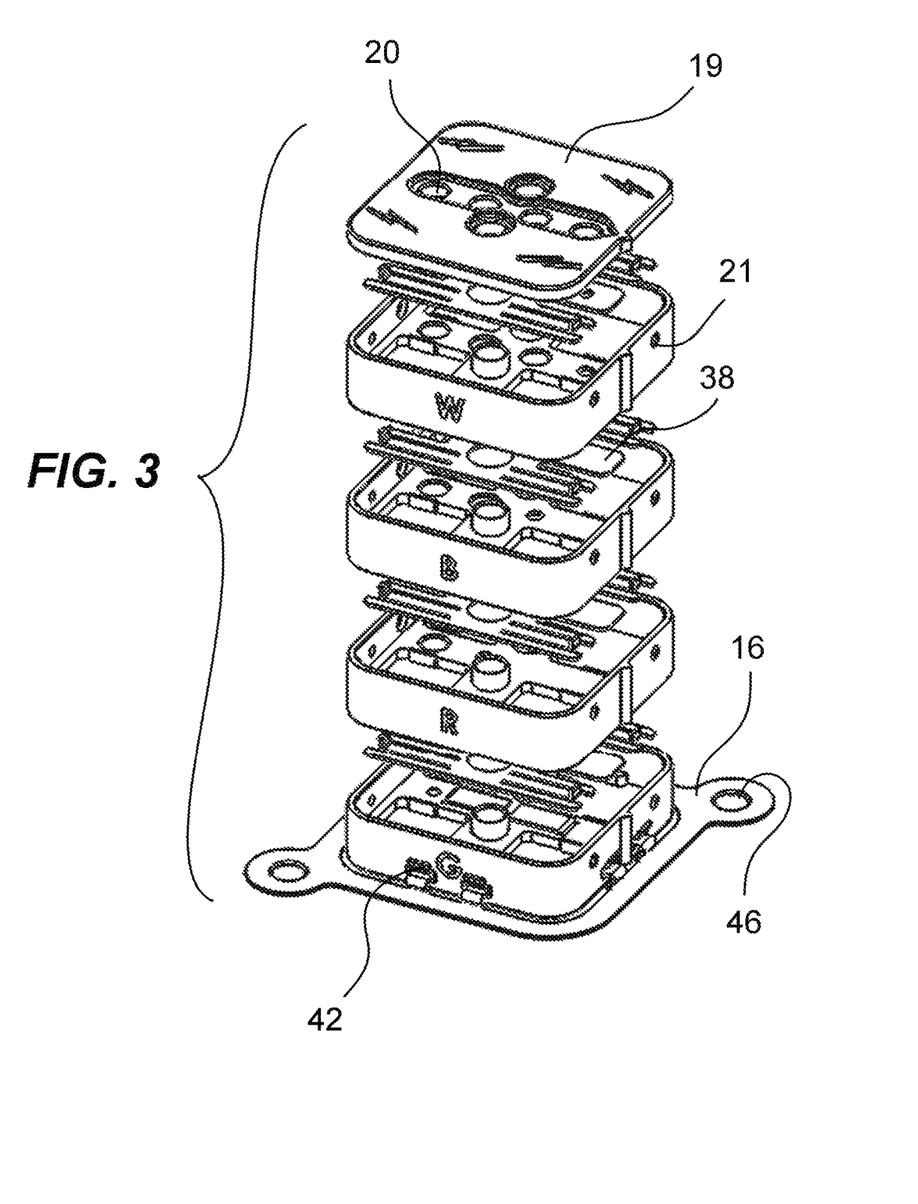
FIG. 3 is an exploded view of the outlet according to an embodiment of the present invention.

Now referring to FIG. 3, a plurality of modules is provided along with module cover 19. The view is exploded for clarity. Bracket 16 is attached to the base module ("G" module) of the plurality of modules. In some embodiments, the bracket includes stubs 42 configured to clip into recesses 44 provided on the base module. It should be understood that other methods of attaching the bottom module to the bracket may be provided without departing from the spirit and scope of the invention. In some embodiments, grommets 46 configured for receiving mechanical fasteners are provided, to secure the bracket to the bottom of the electrical box during use.

In some embodiments, the each module of plurality of modules is configured to clip to the adjacent module preferably in the following order starting from the bottom: G, R, B and W, describing the colors Green, Red, Black and White. A conductive member 38 is positioned inside each module which will be described in greater detail below.

Figure 4A:
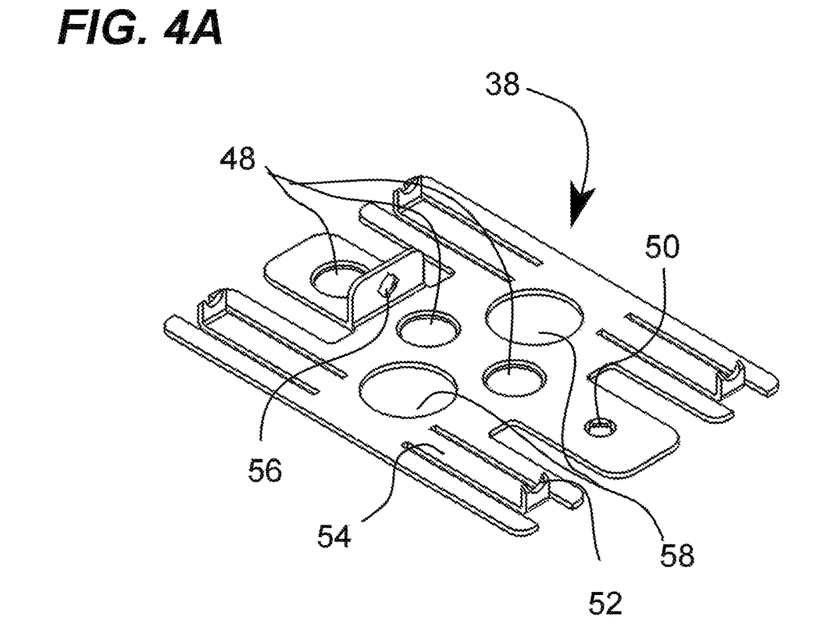
FIG. 4A is a perspective view of a conductive member according to an embodiment of the present invention.
Figure 4B:
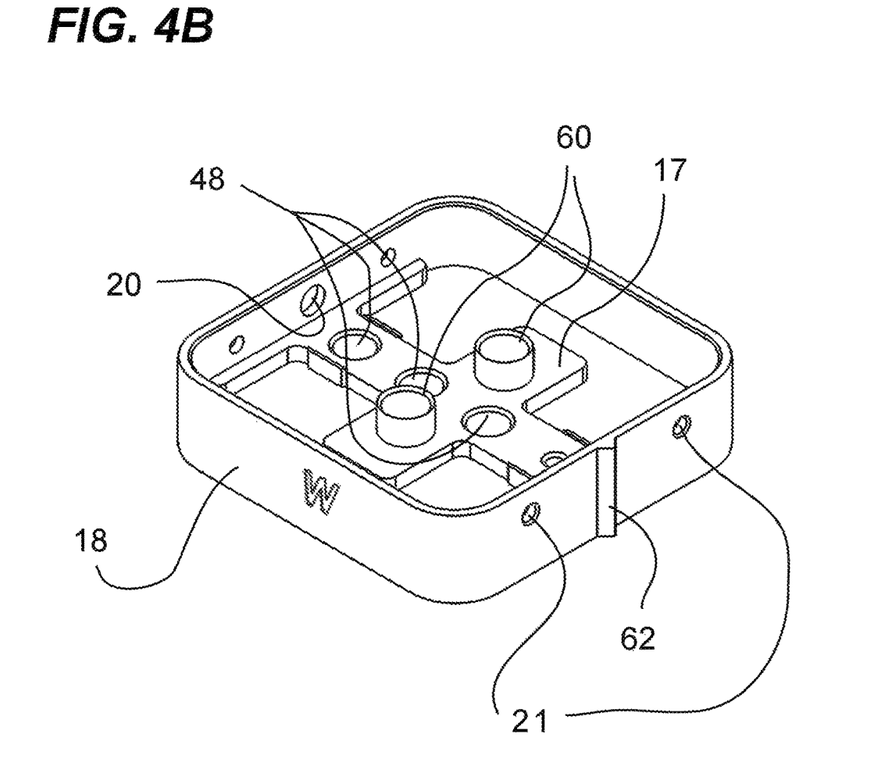
FIG. 4B is a perspective view of a module according to an embodiment of the present invention.
Figure 5A:
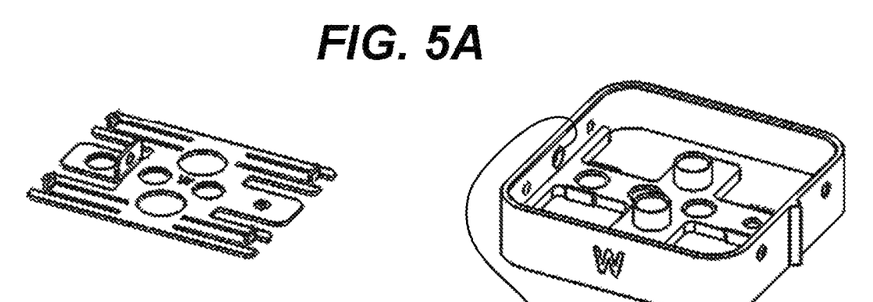
FIGS. 5A-D are various perspective views of the conductive members and their respective modules according to an embodiment of the present invention.
Figure 5B:
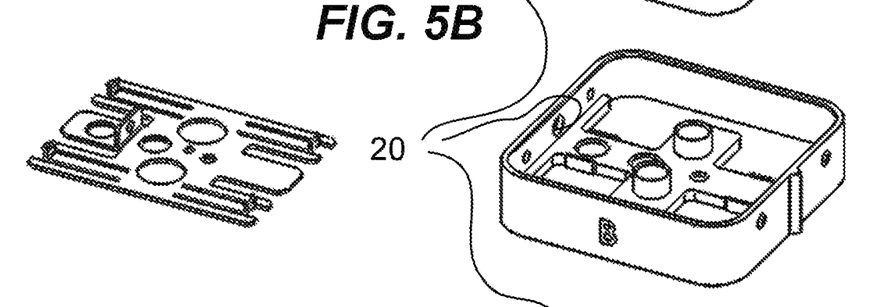
Figure 5C:
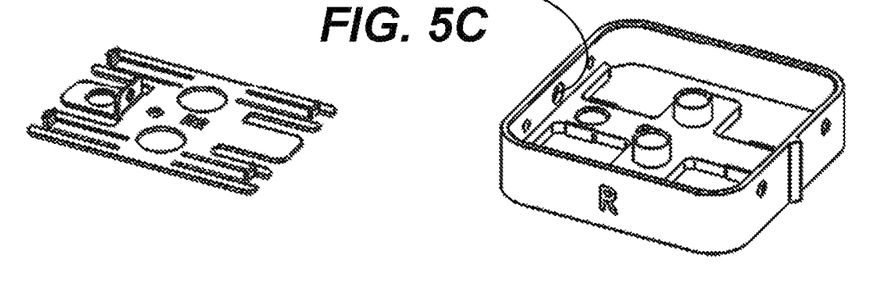
Figure 5D:
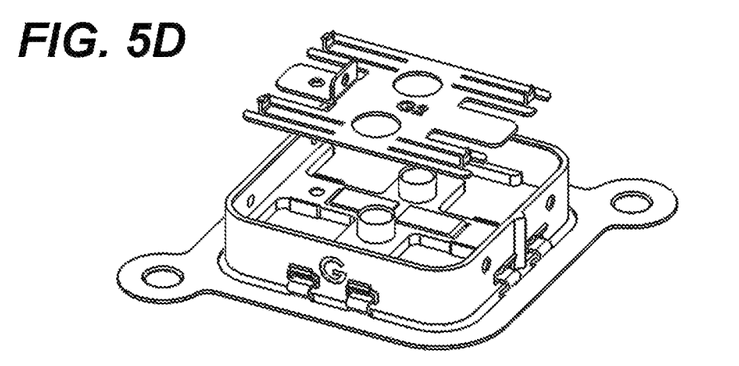

Referring now to FIGS. 4A-B, each module 18 includes a specific molded shape 17 complementary to the specific conductive member 38 configured for it. More specifically, the shape in the module is different for each color, and the shape of the conductive member varies depending on which module it is configured for. Essentially, the difference is in the number of pass-through holes 48 provided in each conductive member. A prong of a prong set is configured to make contact on a small prong tip hole 50. In some embodiments, the conductive member includes four crescent contact points 52 configured for making electrical contacts with wires 26, as seen in FIG. 1B. In one embodiment, the crescent contact points are located at distal ends of flexible tongues 54 such that when inserting the wires, the flexible tongues bend and enabling the crescent contact points to apply pressure on the wires for a better electrical contact. In some embodiments, a mechanical fastening hole 56 is provided, wherein the mechanical fastening hole is provided to fasten the conductive member to the module. In some embodiments, two large openings 58 are provided in the conductive member configured for passing nipples 60 in each module. The nipples extend perpendicularly from the shape inside of the module. The nipples aid in precisely positioning and securing the conductive member. In some embodiments, a "V" ridge 62 provided on the side of each module ensures proper alignment of the plurality of modules. Preferably, the modules are pressure fitted together and sold as a single block.

Now referring to FIG. 7, as previously discussed, a home automation block 31 is used when A/C current is needed such as in fans, lighting fixtures, and other installations that require A/C. The home automation block may be connected onto interface 33. In one embodiment, the interface comprises top section 32 and bottom section 34. In this embodiment, clip member 29 positioned on the home automation block latches onto a cavity formed on the male connector block 13.

The interface is provided in cases when an electrical box is blocked by a plate or cover which blocks access to the power outlet, wherein the interface is to ensure a connection. In these scenarios, the interface plugs into the power outlet the cover is put in place with the interface outside of the electrical box so that the connection with a fixture is possible.

Figure 6A:
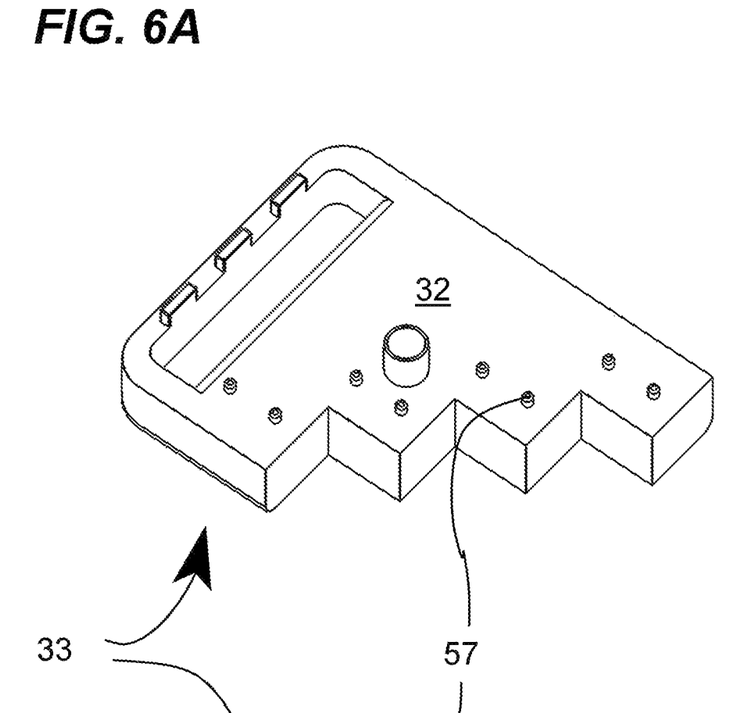
FIGS. 6A-B are perspective views of a top section and a bottom section respectively, the top and bottom sections forming an interface according to an embodiment of the present invention.
Figure 6B:
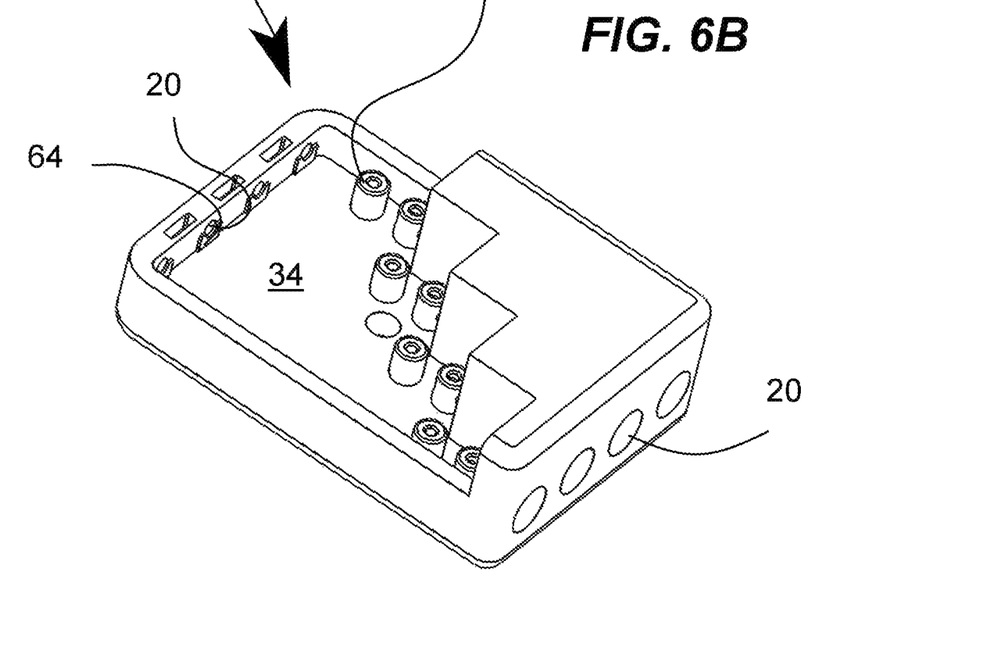
Figure 9:
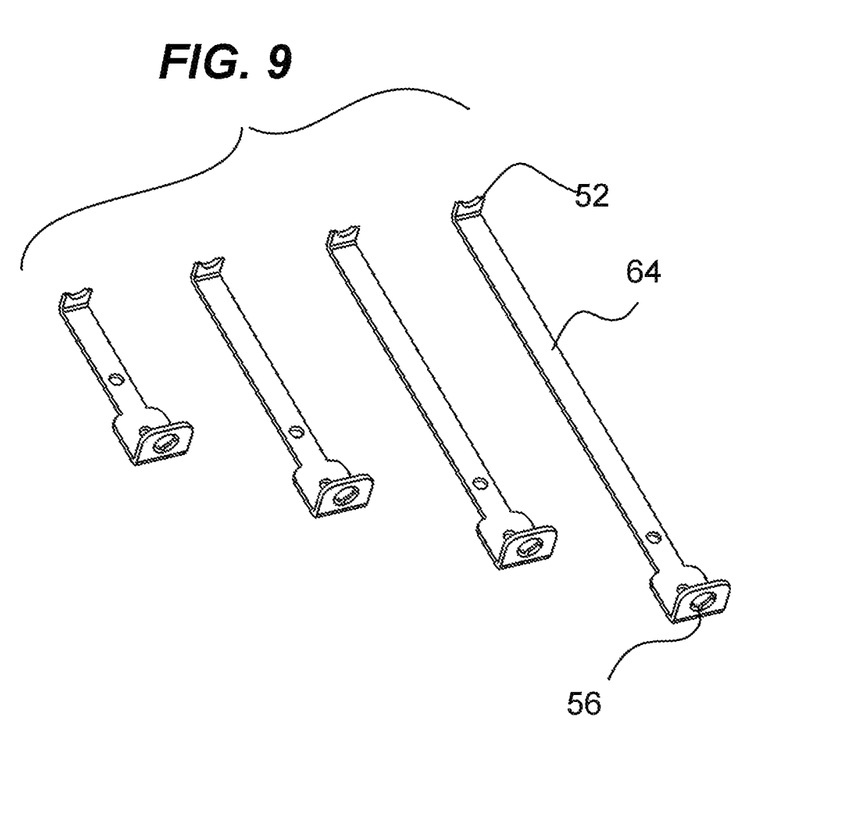
FIG. 9 illustrates a perspective view of the different lengths of the flexible metal blades.

The details of the home automation block are best seen in FIGS. 6A-B, showing the top section and the bottom section separated. In one embodiment, wires 26 are pushed in through power load holes 21 to electrically connect to flexible metal blades 64, best seen in FIG. 9, equipped with crescent contact points 52 at one end and mechanical fastening hole 56 at the opposite end for fastening to the bottom section. Advantageously, a set of protuberances 57 on both the top and bottom sections ensures proper alignment when connecting sections forming the home automation block.

Figure 8A:
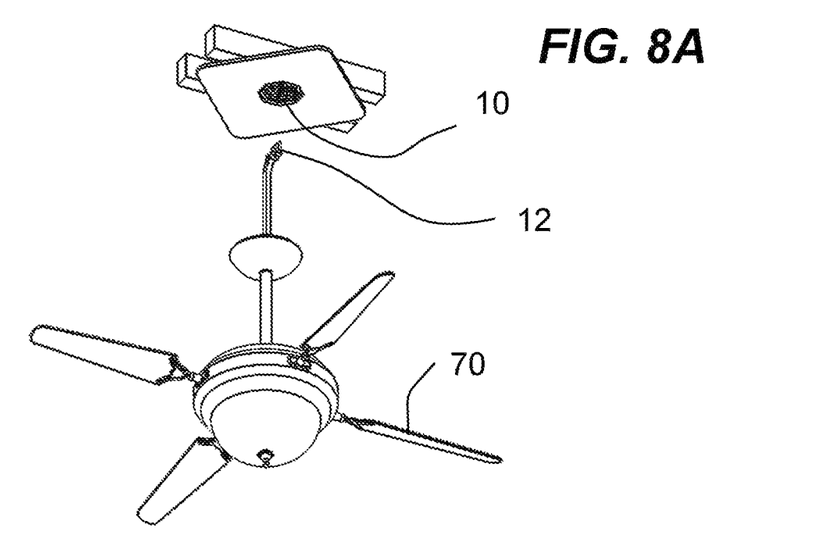
FIGS. 8A-B are perspective views showing the installation of a fan and a light fixture utilizing the present invention.
Figure 8B:
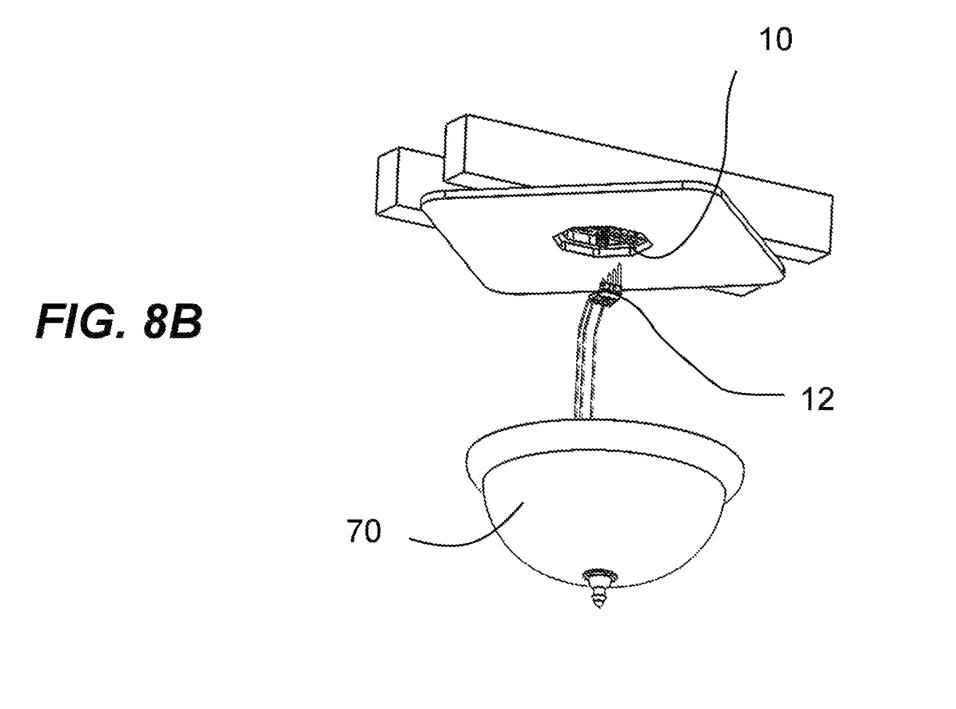

Now referring to FIGS. 8A-B, the installation of the present invention is illustrated. In the preferred embodiment, wires of a fixture 70, such a fan and a light fixture, are stripped at their ends and inserted either the male connector block 13 or to wires 26 which are connected to prong set 22. Next, the plug-in member is plugged into the power outlet and then screwed into the fixture using a supplied threaded tube 40.

Figure 10:
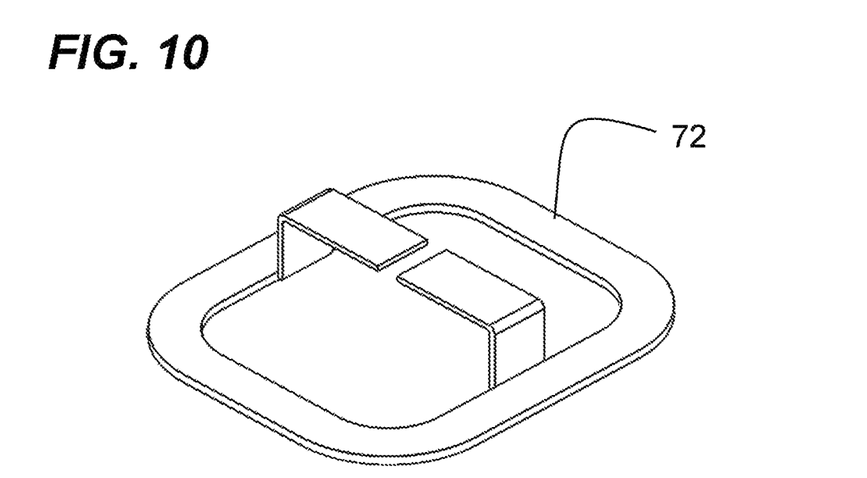
FIG. 10 is a perspective view of a grounding member according to an embodiment of the present invention.
Figure 11:
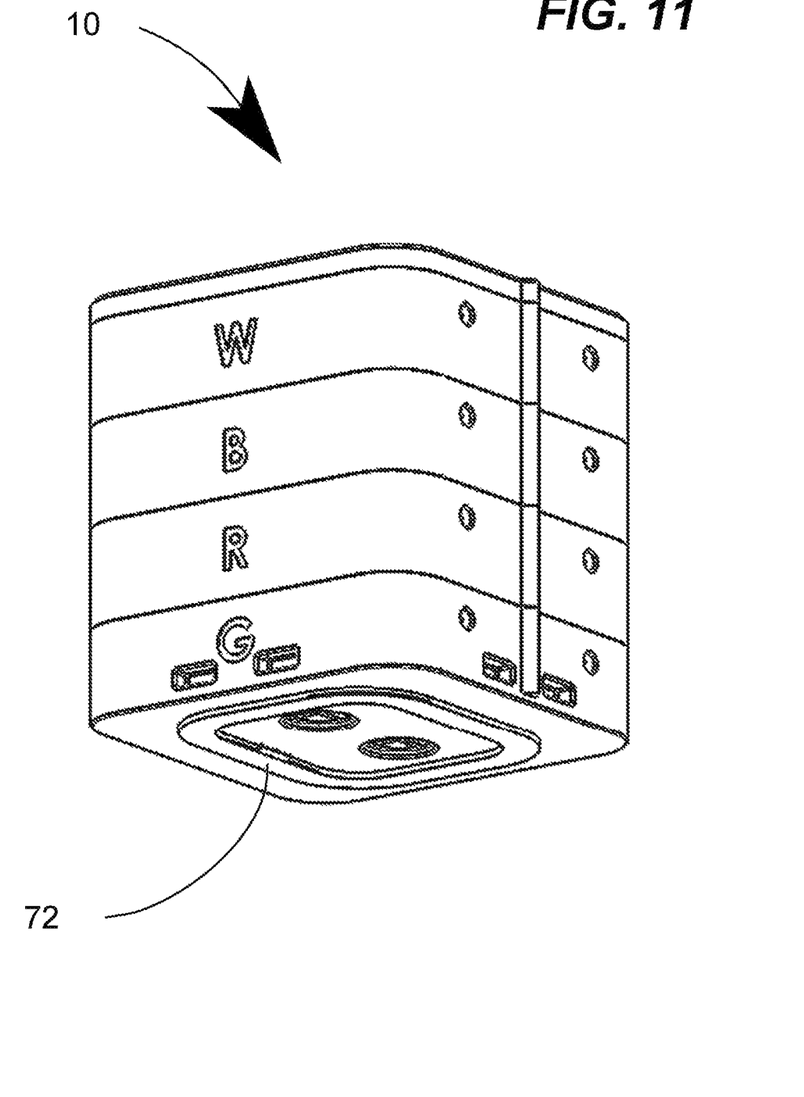
FIG. 11 is a perspective view of the power outlet showing the grounding member according to an embodiment of the present invention.
Figure 12:
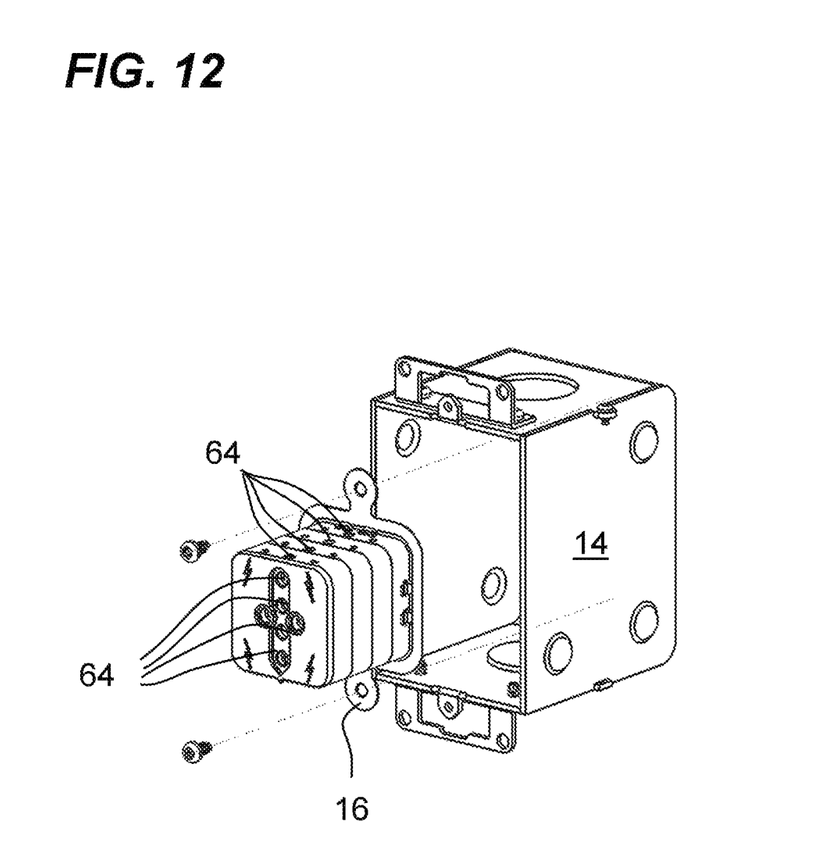
FIG. 12 is a perspective view of an electrical box and the built-in power outlet about to be installed and illustrating the two separate inputs according to an embodiment of the present invention.

Now referring to FIGS. 10-12, the bottom module, "G" module, includes a ground member 72 attached to the underside of the module, wherein the grounding member is configured to ground the modules to the junction box. Best seen in FIG. 12, in some embodiments, the power outlet includes separate outputs directed at fixtures 70 in the guise of the plugging holes 20, one on top and one on the side of the modules as illustrated. It should be noted that only one plug-in member can be plugged into the power outlet at a time, either the top or the side. The stub member 66 partially blocks at least one plugging hole such that only one plug-in member may be connected at one time. The power outlet 10 can act as a junction box for distributing power to other places by using its power load holes 21. Power can come in through one set of load holes 21 (see FIG. 1A), pass through the power outlet 10 and come out through up to three sets of load holes 21, only one set of wires 26 seen coming out through load holes 21 on the opposite side of the power outlet 10 in FIG. 1A.

Advantageously, each module is a different color so connecting the wires to each module is such that the wire color should match the module color providing an ease of installation. Next, the power outlet comprised of the modules is clipped onto the bracket, and then the bracket is fastened to the junction box.

Although the invention has been described in considerable detail in language specific to structural features, it is to be understood that the invention defined in the appended claims is not necessarily limited to the specific features described. Rather, the specific features are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) are not used to show a serial or numerical limitation but instead are used to distinguish or identify the various members of the group.

What is claimed is:

1. An assembly for plugging in electrical fixtures comprising:
    a power outlet comprised of a plurality of modules stacked upon each other having at least one set of plugging holes which provide power to wires going to locations in a house by functioning as a junction box supplying power throughout the house, the modules are within an electrical box, and each of the modules has at least one set of load holes which provide power to a chandelier or fan located outside of the electrical box;
    a plug-in member and a prong set configured to plug into one set of the at least one set of plugging holes;
    a bracket fastened to a bottom portion of the power outlet;
    the electrical box, with the bracket fastened to the electrical box; and,
    an electrical fixture having a set of wires, wherein the set of wires are electrically connected to the plug-in member;
    each prong in the prong set has a unique and different position and length with regard to the other prongs so that the conductive parts of the prong set connects with a specific location on a different module forming part of the assembly.

2. The assembly for plugging in electrical fixtures of claim 1, further comprising a male connector block for connecting to a female connector, wherein the set of wires is connected to the female connector block.

3. The assembly for plugging in electrical fixtures of claim 1, wherein the plurality of modules includes four modules comprised of colors green, red, black, and white corresponding to a ground, power wire for a light, power wire for a fan, and neutral respectively.

4. The assembly for plugging in electrical fixtures of claim 1, further comprising a conductive member positioned inside each module of the plurality of modules.

5. The assembly for plugging in electrical fixtures of claim 4, wherein the conductive member varies depending on which module of the plurality of modules it is intended for.

6. The assembly for plugging in electrical fixtures of claim 4, wherein the conductive member includes a number of contact points configured for making electrical contacts with the set of wires.

7. The assembly for plugging in electrical fixtures of claim 6, each contact point of the number of contact points is located at distal ends of at least one flexible tongue, wherein the at least one flexible tongue is configured to bend and enabling the number of contact points to apply pressure on the set of wires for a secure electrical contact.

8. The assembly for plugging in electrical fixtures of claim 4, wherein each of the conductive members include two large openings configured for passing nipples in each module.

9. The assembly for plugging in electrical fixtures of claim 4, wherein nipples extend perpendicularly from inside each module, wherein the nipples aid in precisely positioning and securing the conductive member to each module.

10. The assembly for plugging in electrical fixtures of claim 3, wherein each module includes a ridge on a side portion to ensure proper alignment of the plurality of modules.

* * * * *